(12) United States Patent
Berg et al.

(10) Patent No.: US 7,588,820 B2
(45) Date of Patent: Sep. 15, 2009

(54) NANO-PARTICLE CORROSION INHIBITING FILMS

(75) Inventors: Robert Berg, Coon Rapids, MN (US); Arthur H. Ahlbrecht, Stillwater, MN (US); Margarita Kharshan, Little Canada, MN (US); Boris A. Miksie, North Oaks, MN (US)

(73) Assignee: Cortec Corporation, St. Paul, MN (US)

( * ) Notice: Subject to any disclaimer, the term of this patent is extended or adjusted under 35 U.S.C. 154(b) by 688 days.

(21) Appl. No.: 11/059,927

(22) Filed: Feb. 17, 2005

(65) Prior Publication Data

US 2006/0182985 A1    Aug. 17, 2006

(51) Int. Cl.
*B32B 27/18* (2006.01)
*B32B 27/32* (2006.01)
(52) U.S. Cl. .................. 428/323; 428/325; 428/516
(58) Field of Classification Search .................. None
See application file for complete search history.

(56) References Cited

U.S. PATENT DOCUMENTS

| 4,410,582 | A | * | 10/1983 | Tsunashima et al. | ......... 428/212 |
| 4,584,175 | A | * | 4/1986 | Martenson | ................. 422/9 |
| 4,944,916 | A | | 7/1990 | Franey | |
| 5,209,869 | A | | 5/1993 | Miksic et al. | |
| 6,224,957 | B1 | * | 5/2001 | Crook et al. | ............. 428/36.91 |
| 6,942,909 | B2 | * | 9/2005 | Shirrell et al. | ............. 428/35.7 |
| 2002/0161096 | A1 | * | 10/2002 | Loontjens et al. | ........... 524/445 |

* cited by examiner

*Primary Examiner*—Monique R Jackson
(74) *Attorney, Agent, or Firm*—Haugen Law Firm PLLP

(57) ABSTRACT

A packaging film for use in inhibiting corrosion in packaged goods includes a polymeric substrate resin, between about 1 and 2% by weight of one or more corrosion inhibiting materials, and between about 2 and 10% by weight of nano-clay particles. The packaging film may be formed as a multiple layer co-extruded film, wherein a first polymeric layer is disposed between a second polymeric layer including nano-clay particles, and a third polymeric layer including one or more corrosion inhibitor materials.

7 Claims, No Drawings

NANO-PARTICLE CORROSION INHIBITING FILMS

FIELD OF THE INVENTION

The present invention relates to packaging films for use in inhibiting corrosion of packaged goods generally, and more particularly to films utilizing a combination of nano-particles and corrosion inhibiting materials for enhanced overall corrosion inhibition characteristics.

BACKGROUND OF THE INVENTION

A wide variety of applications exist in commerce and industry wherein materials and products that are susceptible to corrosion may be protected from corrosive environments through the use of packaging or wrapping films. A common example of items in need of protection from corrosion involve materials and/or products manufactured from corrosion-susceptible metals, which tend to corrode through oxidation when exposed to oxygen in either a gaseous or liquid phase. As such, elements in the atmosphere such as gaseous oxygen and water vapor are agents that tend to cause corrosion in metal materials.

Various film forms have been developed and implemented as wrapping about such corrosion-susceptible materials. These films are often referred to as packaging films, as they are often times utilized in conjunction with product packaging applications. However, such films may also or instead be utilized in protective wrapping applications not commonly associated with product packaging. While films fabricated solely of polymeric materials assist in preventing corrosion agent access to the enclosed materials, certain films having further corrosion inhibiting characteristics have been developed and implemented.

Films currently utilized in corrosion inhibiting applications include those which contain vapor phase corrosion inhibitor (VCI) materials which vaporize from the film into the enclosed package to minimize corrosion caused by any moisture entering into or contained within the enclosure. Moreover, metallized films such as aluminum foil have been utilized as corrosion agent blocking layers to protect materials within the enclosure. Conventional corrosion inhibiting films are described in, for example, U.S. Pat. No. 4,944,916 issued to AT&T Bell Laboratories, and U.S. Pat. No. 5,209,869 issued to the same assignee as in the present application.

Certain manufacturers of protective packaging materials have further attempted to create a composite film structure by laminating a metal foil to a VCI-containing film. Such composite film structures, however, are typically expensive to prepare and are difficult to handle in production, since such composite structures must be prepared in a multi-step process.

Other films have been produced which utilize nano-clay particles dispersed in polyethylene or other polymeric materials. It has been reported that such films incorporating nano-clay particles exhibit improved barrier properties to oxygen and water, improved strength and flame-retardancy, as compared to conventional polyethylene films.

It is therefore a principal object of the present invention to provide a film for use in protecting packaged materials from corrosion, and which films contain both vapor phase corrosion inhibiting materials and nano-clay particles.

It is a further object of the present invention to provide a packaging film having both a corrosion agent inhibiting characteristic and a barrier protection characteristic, and which film is created through a single-step fabrication process.

It is a still further object of the present invention to provide a film formed through a single-step co-extrusion process that incorporates a vapor-phase corrosion inhibitor material and nano-clay particles therein.

SUMMARY OF THE INVENTION

By means of the present invention, a packaging film for use in inhibiting corrosion of packaged materials is provided having vapor phase corrosion inhibiting characteristics and corrosion agent barrier characteristics. The film of the present invention enables such physical characteristics through the inclusion of both VCI materials and nano-clay particles in a film formed through a single-step process. Such a one-step formation operation may be performed in a blown film extruder.

In a particular embodiment, the packaging film of the present invention includes a polymeric substrate resin and between about 1 and 2% by weight of one or more vapor phase corrosion inhibiting materials selected from the group including sodium molybdate, sodium nitrite, sodium erythorbate, benzotriazole, disodium sebacate, benzoates of amine salts, sodium benzoate, nitrates of amine salts, and combinations thereof. The packaging film preferably further includes between about 2 and 10% by weight nano-clay particles.

In another embodiment, a multiple layer co-extruded film of the invention includes a first layer of polyethylene, a second layer of polyethylene and nano-clay particles, and a third layer of polyethylene and one or more corrosion inhibitor materials. The second layer preferably includes between about 2 and 10% by weight of the nano-clay particles, balance polyethylene. The third layer preferably between about 1 and 2% by weight of the one or more corrosion inhibitor materials, balance polyethylene.

DETAILED DESCRIPTION OF THE PREFERRED EMBODIMENTS

The objects and advantages enumerated above together with other objects, features, and advances represented by the present invention will now be presented in terms of detailed embodiments which are intended to be representative of various possible embodiments of the invention. Other embodiments and aspects of the invention are recognized as being within the grasp of those having ordinary skill in the art.

Formulations and blends of films useful in the present invention are described in detail hereinbelow, and with reference to the examples. The films of the present invention preferably include nano-clay particles and corrosion inhibiting materials blended with a polymeric substrate resin. The blends are preferably formed into single or multiple layer films through a single step process, such as through extrusion or co-extrusion film-forming processes. Other single-step film formation techniques, however, are contemplated by the present invention as being useful in producing the protective films of the present invention.

Nano-clay particles dispersed in, for example, polyethylene resin, is available commercially under the trade name "Nanoblend 2001", from Poly-One Corporation of Avon Lake, Ohio. The Nanoblend 2001 material is preferably blended with a polymeric substrate resin such as polyethylene to produce a mixture having between about 2 and 10% by weight nano-clay particles. Nano-clay particles mixed with polymeric resins are also available from other commercial sources.

As the examples below demonstrate, known VCI materials are preferably blended into the films of the present invention at a concentration of between about one and two percent by weight. Though a wide variety of such VCI materials may be utilized in the films of the present invention, example inhibitor materials include sodium molybdate, sodium nitrite, sodium erythorbate, benzotriazole, disodium sebacate, benzoates of amine salts, sodium benzoate, nitrates of amine salts, and combinations thereof.

In a particularly preferred embodiment of the invention, a multiple layer co-extruded film is obtained in a single-step co-extrusion process. The multiple layer film includes a first layer of polyethylene, a second layer including between about 2 and 10% by weight nano-clay particles with balance polymer, and a third layer including a polymer and between about 1 and 2% by weight of one or more corrosion inhibitor materials as described above. The co-extruded film preferably contains the first layer between the second and third layers. In packaging applications wherein the co-extruded film is utilized to create a protective enclosure about corrosion-susceptible materials, the third layer is preferably inwardly disposed so as to be adjacent to the packaged goods, while the second layer is oriented relatively distal to the packaged goods. The Applicants theorize that the second layer containing the nano-clay particles acts as a film strengthening and corrosion agent barrier layer to minimize and/or prevent corrosive agents from entering into the enclosure, while the VCI-containing third layer acts to operably neutralize any existing or permeating corrosion agents within the enclosure. The combination, therefore, provides an enhanced packaging film for inhibiting corrosion on materials contained within an enclosure defined by such films.

Corrosion inhibitor material master batches for use in example film blends were prepared as follows:

Masterbatch

A master batch was prepared in a twin screw extruder from polyethylene and vapor corrosion inhibition chemicals in the following ratios:

| Polyethylene | 85 parts |
| --- | --- |
| Disodium sebacate | 7.0 parts |
| Benzotriazole | 1.0 parts |
| Sodium benzoate | 6.0 parts |
| Sodium erythorbate | 1.0 part |

The features and characteristics of the present invention may be achieved in preparations in accordance with the following examples:

EXAMPLE 1

A mixture of "Poly-One Nanoblend 2001" and polyethylene was prepared from 1 part "Nanoblend 2001" and 11 parts polyethylene. After thorough blending, a film was produced from a circular die maintained at a temperature of about 165° C. in a conventional blown film machine. Physical properties were improved significantly as compared with a similar film with no nano particles as elongation at break was reduced from about 800% to 300% and the impact and puncture resistance increased 10%.

EXAMPLE 2

A mixture prepared with the same materials as Example 1 was blended with the Masterbatch to produce a final composition of 2% VCI chemicals and 8% nano-clay particles. The film prepared from the blended material showed improved physical properties.

EXAMPLE 3

A co-extruded film of three layers was prepared with the Example 1 material in one layer, a middle layer of only polyethylene, and a third layer of polyethylene incorporating the Masterbatch at a 10% level. Corrosion results clearly show that the co-extruded film had excellent corrosion inhibition properties. Physical properties were also improved with the tearing resistance 50% higher than a similar film without "Nanoblend 2001".

EXAMPLE 4

A co-extruded film of three layers was prepared with the middle layer prepared with the Example 1 mixture, the top layer made with polyethylene, and the bottom layer with the Masterbatch. This co-extruded film also exhibited enhanced properties as compared to conventional corrosion inhibiting films.

The co-extruded film of Example 3 showed reduced oxygen penetration when subjected to oxygen penetration measurements. Fifteen samples of film made solely with polyethylene and 2% by weight vapor corrosion inhibitor chemicals were compared to fifteen samples of Example 3 film for oxygen penetration. The control samples ranged from 5569 to 3804 cc/meter$^2$/day, with an average of 4736 cc/meter$^2$/day. The Example 3 films ranged from 4338 to 2981 cc/meter$^2$/day, with the average of 3517 cc/meter$^2$/day, a reduction of 25%, which was due to the nano-clay containing barrier layer.

When moisture recording devices, such as an Abatel Datascribe Environmental Monitor model # RH-52, were sealed in bags made from the same comparison films as described above and placed in an ASTM D 1748-83 humidity testing environment, substantially reduced moisture transmission levels were obtained with the Example 3 films, as compared to that of the VCI-only films described in the patents cited above. ASTM D 1748-83 is a standardized test procedure for measuring moisture ingress into sealed bags. The test measures relative humidity inside a sealed bag with an electronic device that records temperature and relative humidity inside the bag. A vapor corrosion control polyethylene bag prepared as described in U.S. Pat. No. 5,209,869 was tested in the ASTM procedure and 100% relative humidity was recorded inside the bag in one hour. A bag prepared from films generated as described in Example 3 recorded 100% humidity in nine hours testing. In total, three primary advantages of reduced moisture penetration, reduced oxygen penetration, and corrosion inhibition associated with the films of the present invention provides an enhanced enclosure to be used for protecting metallic objects in storage and shipment.

What is claimed is:

1. A multiple layer co-extruded film consisting of:
   (a) a first layer consisting essentially of a first polymer composition consisting of polyethylene;
   (b) a second layer consisting essentially of said first polymer composition and nano-clay particles; and
   (c) a third layer consisting essentially of said first polymer composition and one or more corrosion inhibitor materials selected from the group consisting of sodium molybdate, sodium nitrite, sodium erythorbate, benzotriazole, disodium sebacate, benzoates of amine salts, sodium benzoate, nitrates of amine salts, and combinations thereof.

2. A multiple layer co-extruded film as in claim 1 wherein said first layer is disposed between said second and third layers.

3. A multiple layer co-extruded film as in claim 2 being utilized in packaging for corrosion-susceptible goods, wherein said third layer is operably disposed adjacent to the packaged goods.

4. A multiple layer co-extruded film as in claim 1 wherein said second layer includes between about 2 and 10% by weight nano-clay particles, balance said first polymer composition.

5. A multiple layer co-extruded film as in claim 1 wherein said third layers includes between about 1 and 2% by weight of said one or more corrosion inhibitor materials, balance said first polymer composition.

6. A method for inhibiting corrosion and corrosive agent exposure to a corrosion-susceptible article, said method comprising:
 (a) co-extruding a multiple-layer film consisting of:
  (i) a first layer consisting essentially of a first polymer composition consisting of polyethylene;
  (ii) a second layer consisting essentially of said first polymer composition and nano-clay particles; and
  (iii) a third layer consisting essentially of said first polymer composition and one or more corrosion inhibitor materials selected from the group consisting of sodium molybdate, sodium nitrite, sodium erythorbate, benzotriazole, disodium sebacate, benzoates of amine salts, sodium benzoate, nitrates of amine salts, and combinations thereof; and
 (b) wrapping said multiple-layer film about said corrosion-susceptible article, wherein said third layer of said multiple-layer film is proximately disposed with respect to said corrosion-susceptible article, and said second layer is distally disposed with respect to said corrosion-susceptible article.

7. A method as in claim 6 wherein said second layer of said multiple-layer film includes between about 2 and 10% by weight nano-clay particles, balance said first polymer composition.

* * * * *

UNITED STATES PATENT AND TRADEMARK OFFICE
CERTIFICATE OF CORRECTION

PATENT NO. : 7,588,820 B2  Page 1 of 1
APPLICATION NO. : 11/059927
DATED : September 15, 2009
INVENTOR(S) : Robert Berg et al.

It is certified that error appears in the above-identified patent and that said Letters Patent is hereby corrected as shown below:

Title Page
In the patent as received from the U.S. Patent and Trademark Office:
Page 1, Section (75), Line 4, replace "Miksie" with --Miksic--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,588,820 B2  Page 1 of 1
APPLICATION NO. : 11/059927
DATED : September 15, 2009
INVENTOR(S) : Berg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 991 days.

Signed and Sealed this

Twenty-first Day of September, 2010

David J. Kappos
*Director of the United States Patent and Trademark Office*